July 27, 1926.

F. ADAMI

GAS COOKING STOVE

Filed Jan. 18, 1923     3 Sheets-Sheet 1

1,594,187

Inventor
F. Adami
by
W. E. Evans
Attorney.

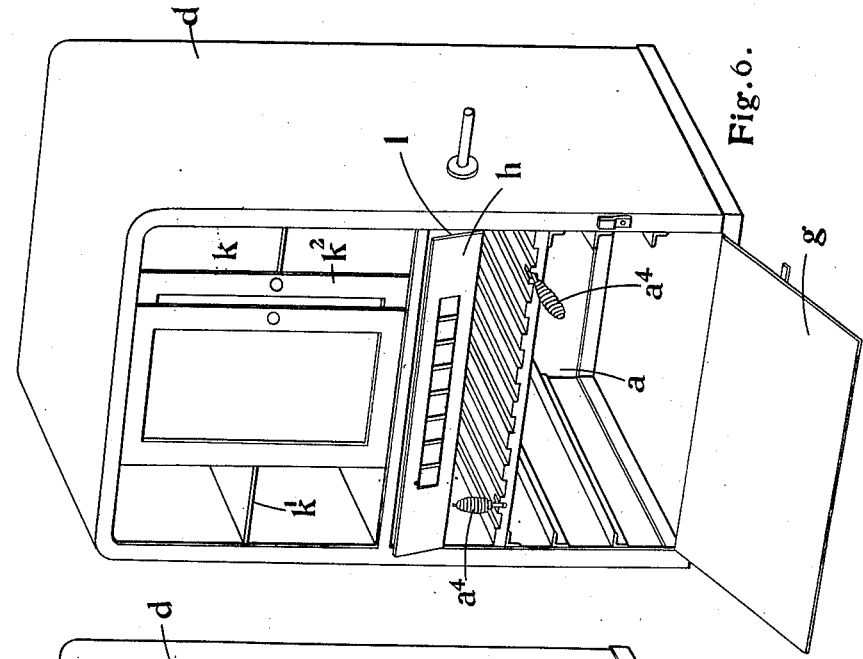
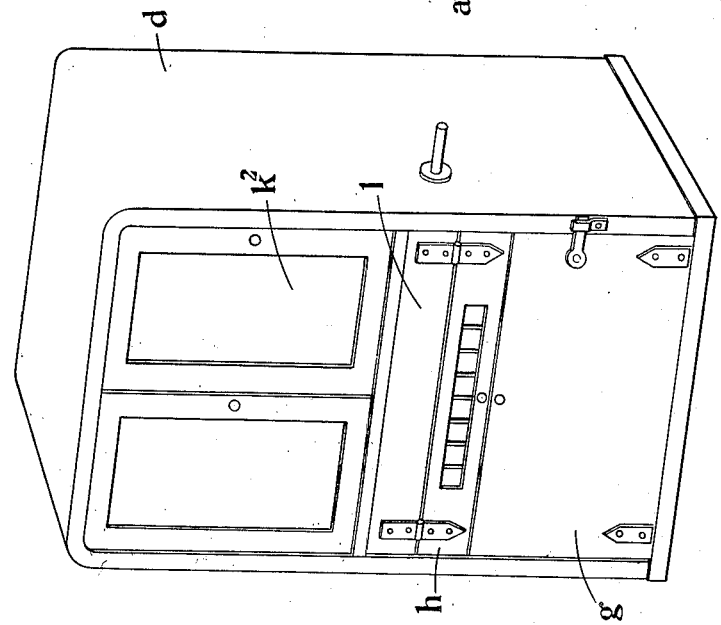

Patented July 27, 1926.

1,594,187

UNITED STATES PATENT OFFICE.

FELIX ADAMI, OF SURREY, ENGLAND.

GAS COOKING STOVE.

Application filed January 18, 1923, Serial No. 613,401, and in Great Britain January 18, 1922.

This invention relates to gas cooking stoves and has for its object to provide cooking stoves in which the heat is efficiently and effectively utilized.

According to the invention I provide a massive plate of metal capable of being brought into proximity to the gas flame, that the plate may be heated preparatory to the cooking operation, the plate being adapted to be removed from the position in which it is heated to a lower position, so that thus the food to be cooked may then be disposed between the gas flame and the heated massive plate so that thus heat may be radiated on to the food from above and below and thus the cooking may be quickly and uniformly effected.

According to the invention the burner nozzles are disposed beneath a massive slab which may be provided of firebrick or other refractory substance or may be also provided as a massive metal plate and thus serve for the accumulation of heat. By such means the cooking may be effected or may be completed after the flame has been extinguished.

The invention comprises the constructional features hereinafter described.

The invention is illustrated in the accompanying drawings, in which—

Figures 6 and 7 are perspective views of a modification.

Figure 1:
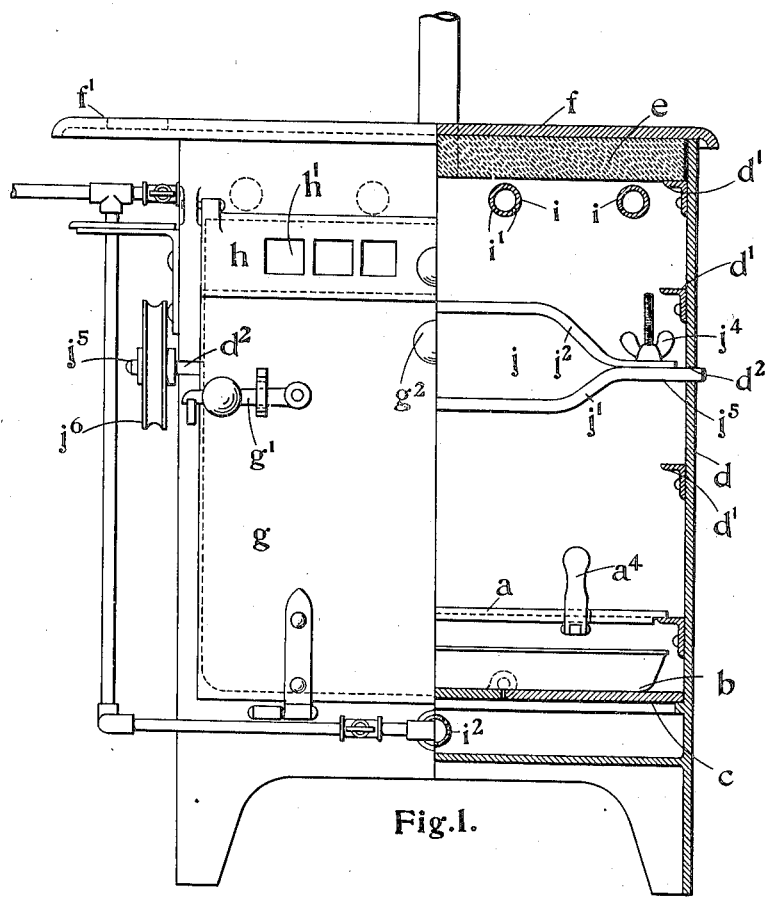
Figure 1 represents a front elevation partly in section of a gas cooking stove provided according to the invention.
Figures 4, 5:
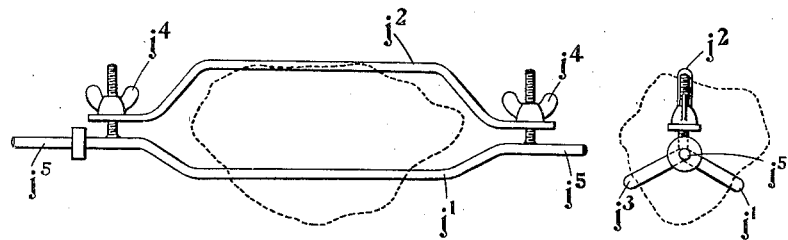
Figures 4 and 5 are detail views of the spit.
Figure 2:
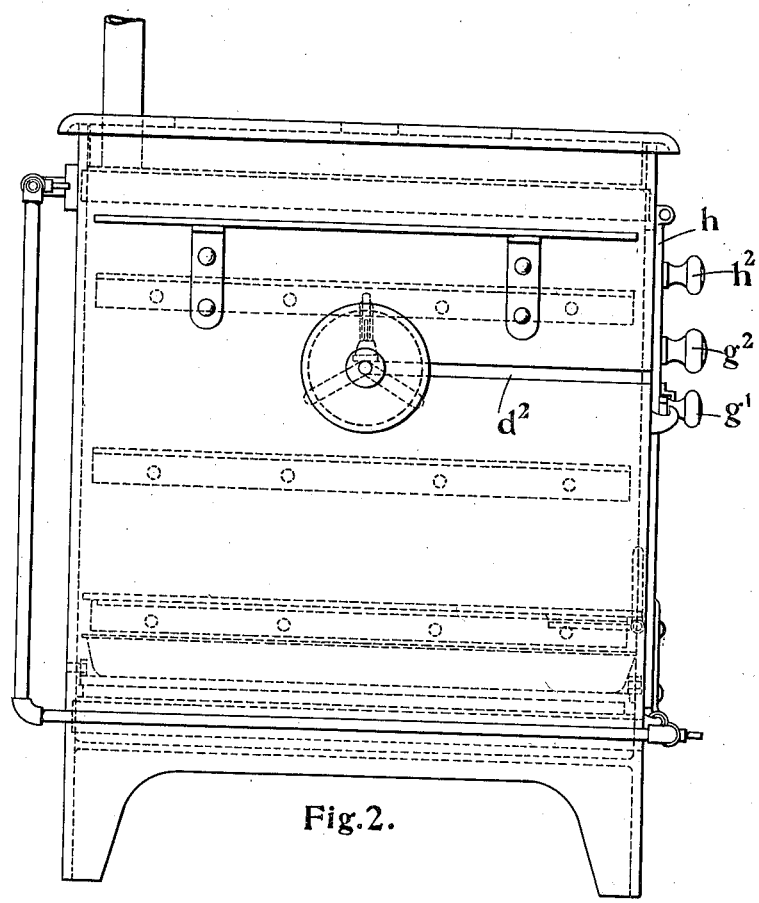
Figure 2 is a side elevation corresponding to Figure 1.
Figure 3:
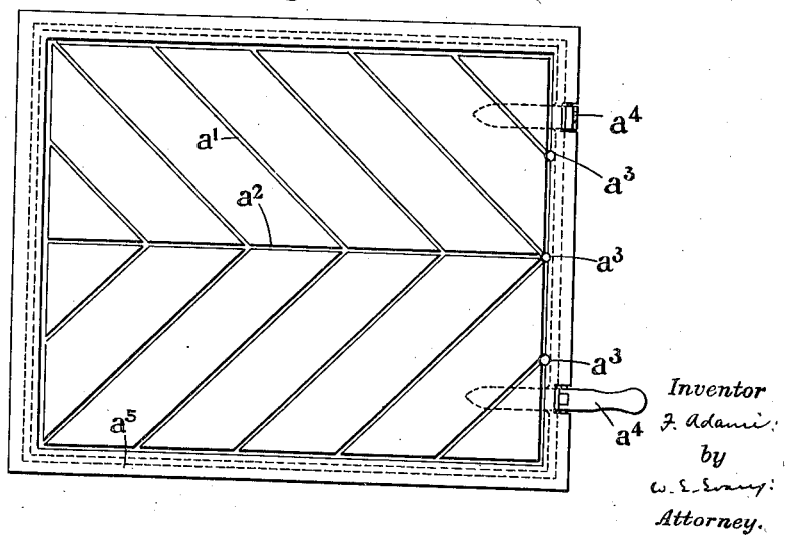
Figure 3 is a plan detail view of the massive metal plate.

In carrying the invention into effect as illustrated in Figures 1 to 3 of the accompanying drawings, I provide a massive metal plate $a$ having angular grooves such as $a^1$ and $a^2$ on its upper face which terminate in holes $a^3$ as a means by which the juices from the joints may fall into a dish such as $b$ disposed on the bottom plate $c$ of the stove. The casing $d$ of the stove is provided of a rectangular form and on the inner faces of the two opposite side walls, parallel disposed sets of ledges $d^1$ are provided. The uppermost serves as a means by which a massive firebrick slab $e$ is held in position beneath the top metal plate $f$ of the stove while the others are provided for the reception of the massive plate $a$. This latter is provided at its front edge with pivoted handles $a^4$. These are pivotally mounted in such manner that they may be brought into a substantially vertical position necessary for the purpose of closing the front door $g$ of the stove, the handles being of a convenient form for being engaged when it is desired to withdraw the plate from one set of ledges $d^1$ and to apply it upon another. The front of the casing $d$ of the stove is provided with an opening capable of being closed by the door $g$ which is pivotally mounted near its lower edge as indicated and is adapted by means of a latch $g^1$ to be held in its uplifted and closed position. A knob or handle $g^2$ serves for the purpose of moving it. In addition to the door $g$ another door $h$ is provided above the door $g$ and this door is pivotally mounted near its upper edge and serves for the reception of observation windows $h^1$ of mica or other suitable material. The lower edge of the door $h$ is rabbeted so as to be engaged by the upper edge of the door $g$ and the door $h$ is provided with a handle $h^2$ by means of which it may be moved.

Beneath the slab of refractory material $e$ a series of burner tubes $i$ are mounted having a series of perforations $i^1$ beneath them through which a series of flames are directed downwardly. In a middle position a spit $j$ may be provided comprising a main part, which consists of two parallel disposed and rigidly connected parts $j^1$ $j^3$ and a third parallel disposed part $j^2$. The part $j$ is adjustably mounted on the part $j^1$ and is capable of being opened out in order that the joint to be cooked may be inserted and held, on the movable part $j^2$ being brought into its normal position where it is retained by means of the thumb screws $j^4$. The respective ends $j^5$ of the part $j^1$ of the spit are concentrically disposed. The spit is removable from the casing of the stove and for this purpose two parallel slots $d^2$ in the opposite side walls of the stove are provided for the reception of the ends $j^5$ of the spit and upon one of these ends a pulley $j^6$ may be mounted which is capable of rotation by a spring motor or by any other suitable means. The pulley $j^6$ may, however, serve for the periodic rotation of the spit by hand so as thus to avoid the necessity of opening the stove for this purpose. Beneath the plate $c$ another gas burner tube $i^2$ may be disposed by which the plate c may be heated. An outlet for the waste gases may be provided in the top plate f or in any other position.

It will be understood that the spit j may be removed when it is not desired to use it and that any number of plates a may be provided which may be preliminarily heated and then disposed on the respective sets of ledges so as thus to cook a number of dishes, joints, or foods by the radiation of heat from above and below in the manner described.

The top plate f may be adapted for cooking and the slab e may have recesses or holes therein and corresponding holes may be provided in the plate f and burner rings may be provided in suitable position so that when desired saucepans or other cooking utensils may be heated by mounting them upon the plate in position over the respective burners. Such burner rings may be provided beneath the overhanging edge $f^1$ of the plate f. The massive plate a may be provided with a downwardly protruding rim $a^5$ as illustrated in Figure 3.

In carrying the invention into effect as illustrated in Figures 6 and 7, the upper part of the casing d may be provided as a hot closet h and this may be divided by a partition $h^1$ and may be provided with sliding doors $h^2$. In position between the hot closet and the stove proper, at l a water boiler may be provided.

In Figure 6 of the drawing the door h is shown in its open uplifted position and the door g in its lower open position by which the interior of the stove is exposed as well as the massive metal plate a. In this case the plate is provided with straight grooves down which the juices may trickle on to the dish at the bottom of the stove.

I claim:—

1. A gas cooking stove comprising an oven, burners disposed in said oven above and within the cooking space, a massive heat-retaining plate formed to extend transversely within said oven, supports to maintain said massive plate in proximity to said burners for the heating of said massive plate, and alternative supports to maintain said massive plate below the said cooking space, whereby food to be cooked may be introduced between said burners and the said massive plate when the latter is disposed below the said cooking space to receive heat from both the said burners and the said massive plate.

2. A gas cooking stove comprising an oven burners disposed in the upper part of said oven, a massive heat-retaining plate formed to extend transversely within said oven, grooves in the upper surface of said massive plate, perforations in said massive plate in connection with said grooves, supports to maintain such massive plate in proximity to said burners for the heating of said massive plate, supports to maintain said massive plate at a distance below said burners, means to carry food to be cooked between said massive plate and said burners, and a receptacle to receive food juices falling upon said massive plate and passing through the perforations thereof.

3. A gas cooking stove comprising an oven, burners disposed in said oven above and within the cooking space, two massive heat-retaining plates, means for supporting said massive plates in opposing positions with said burners between them for the heating of said massive plates by the flames of said burners, and means to support one of said massive plates at a distance from said burners such that food to be cooked may be introduced between said massive plate and said burners so as to be subjected to heat from both of said massive plates and also from said burners.

4. A gas cooking stove comprising an oven, burners disposed in said oven, a massive heat-retaining plate formed to extend transversely within said oven, supports to maintain said massive plate in proximity to said burners for the heating of said massive plate, supports to maintain said massive plate at a distance from said burners, whereby food to be cooked may be introduced between said massive plate and said burners to receive heat from both, and a water boiler and a hot closet also heated by said burners.

FELIX ADAMI.